United States Patent [19]
James et al.

[11] Patent Number: 5,779,254
[45] Date of Patent: Jul. 14, 1998

[54] MOTORCYCLE FOOTREST

[75] Inventors: Raymond H. James, Menomonee Falls; Gene W. Squire, Pewaukee, both of Wis.

[73] Assignee: Squire & James, Ltd., Menomonee Falls, Wis.

[21] Appl. No.: 626,137

[22] Filed: Apr. 5, 1996

[51] Int. Cl.$^6$ .............. B60R 3/00; B62H 1/08; G05G 1/18; B62J 25/00

[52] U.S. Cl. .......... 280/291; 180/219; 74/564; 296/75; D12/114

[58] Field of Search .......... 280/288.4, 304.4, 280/291, 166, 165, 163, 169; 74/564, 560; D12/114; D21/191; 296/75; 180/219

[56] References Cited

U.S. PATENT DOCUMENTS

| | | | |
|---|---|---|---|
| D. 283,413 | 4/1986 | Preisler et al. | D13/114 |
| 588,873 | 8/1897 | Nisbet | 280/291 |
| 593,678 | 11/1897 | Neider | 280/291 |
| 598,356 | 2/1898 | Borgfeldt | 280/291 |
| 3,794,353 | 2/1974 | Oliver | 280/291 |
| 4,023,821 | 5/1977 | Eiland | 280/291 |
| 4,030,561 | 6/1977 | Hashimoto et al. | 280/291 |
| 4,451,057 | 5/1984 | Lawson | 280/291 |
| 4,456,090 | 6/1984 | Malenotti | 180/219 |
| 4,632,453 | 12/1986 | Robbin et al. | 280/291 |
| 4,802,684 | 2/1989 | Bennett | 280/291 |
| 5,090,715 | 2/1992 | Nakajima et al. | 180/219 |
| 5,354,086 | 10/1994 | Mueller | 280/291 |
| 5,638,723 | 6/1997 | Lin | 74/564 |
| 5,661,999 | 9/1997 | Carone | 280/291 |

FOREIGN PATENT DOCUMENTS

| | | | |
|---|---|---|---|
| 480242 | 4/1953 | Italy | 280/291 |
| 2-164679 | 6/1990 | Japan | 295/795 |
| 2-164680 | 6/1990 | Japan | 296/75 |
| 2-164681 | 6/1990 | Japan | 296/75 |
| 2-293283 | 12/1990 | Japan | 280/291 |
| 85974 | 3/1953 | Netherlands | 280/291 |
| 90490 | 10/1958 | Netherlands | 280/291 |
| 196761 | 5/1923 | United Kingdom | 208/26 |
| 2093774 | 9/1982 | United Kingdom | 296/75 |

*Primary Examiner*—Douglas C. Butler
*Attorney, Agent, or Firm*—Wheeler Kromholz & Manion

[57] ABSTRACT

A secondary footrest assembly is supplied for use by a passenger for use on a motorcycle to permit the passenger to vary his or her foot position. A preferred embodiment of the footrest assembly utilizes an elongated arm member arranged for support at its lower end, to a cantilever support member conventionally used to provide support to a foldable pedal-type footrest or to a conventional foldable peg-like footrest. The cantilever support member and the support at the lower end of the elongated arm member are each preferably configured in registering cross-section to prevent or resist torque exerted on the arm when foot pressure is applied to an alternate footrest extending from and supported by the distal end of the lever arm.

9 Claims, 5 Drawing Sheets

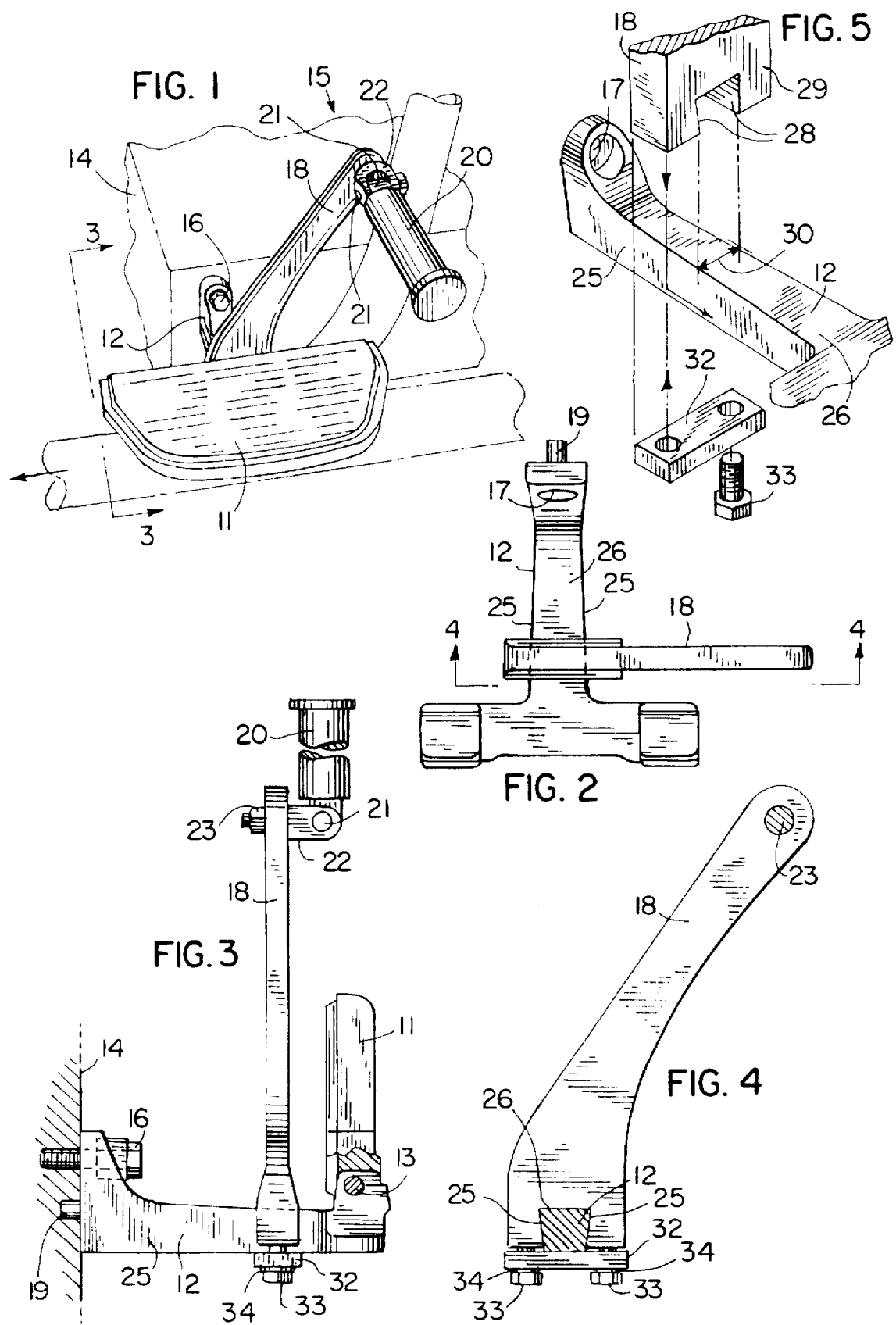

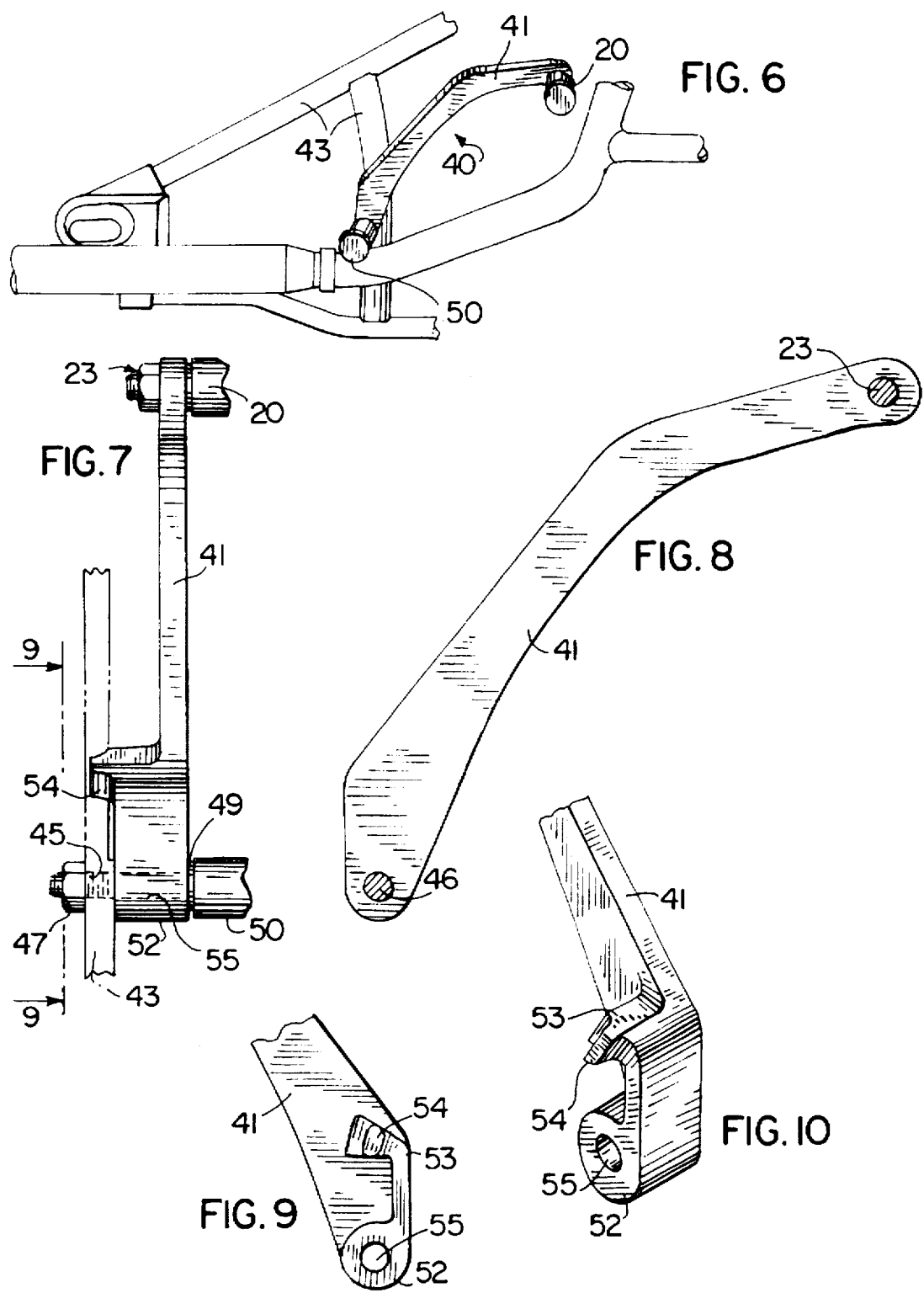

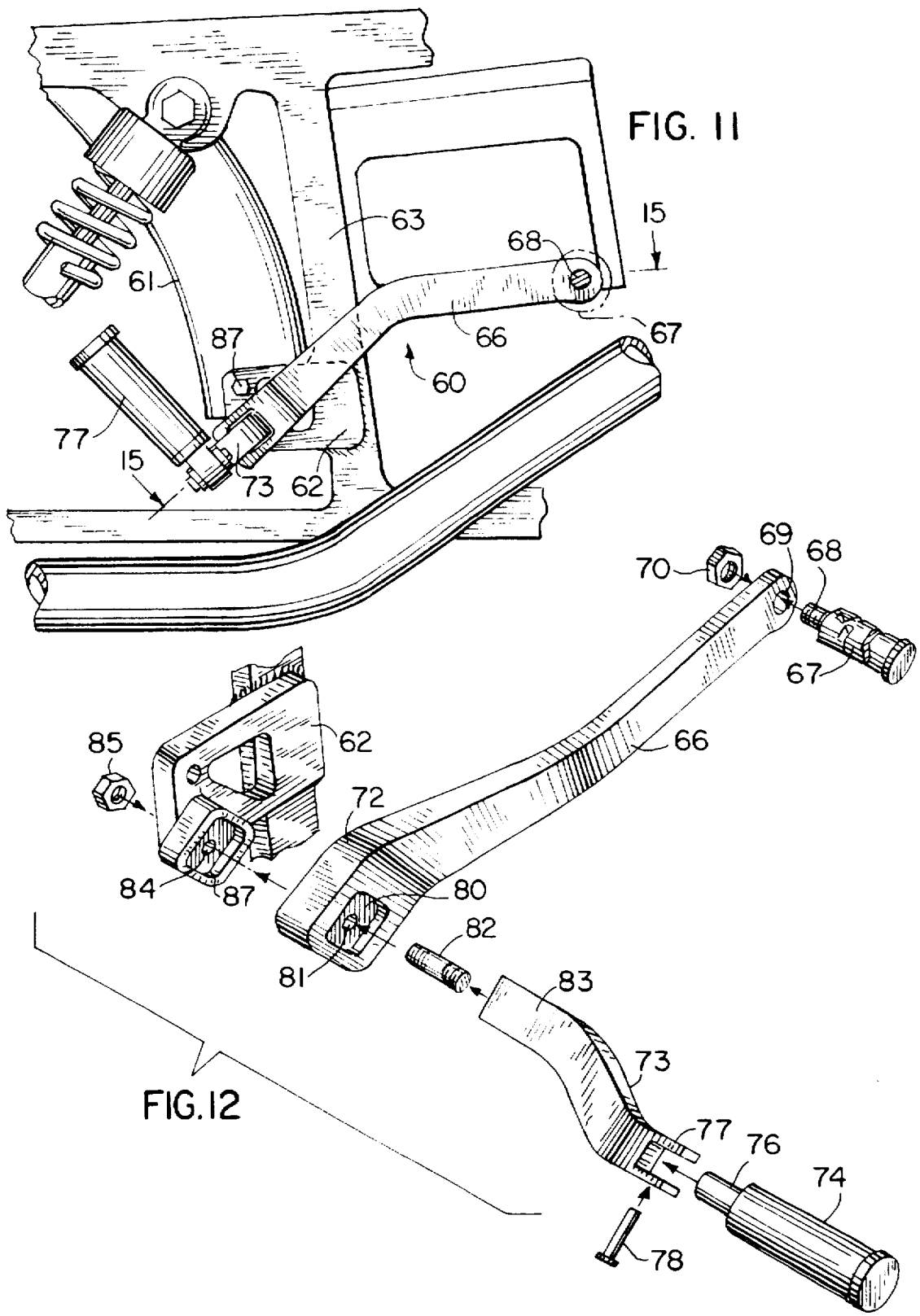

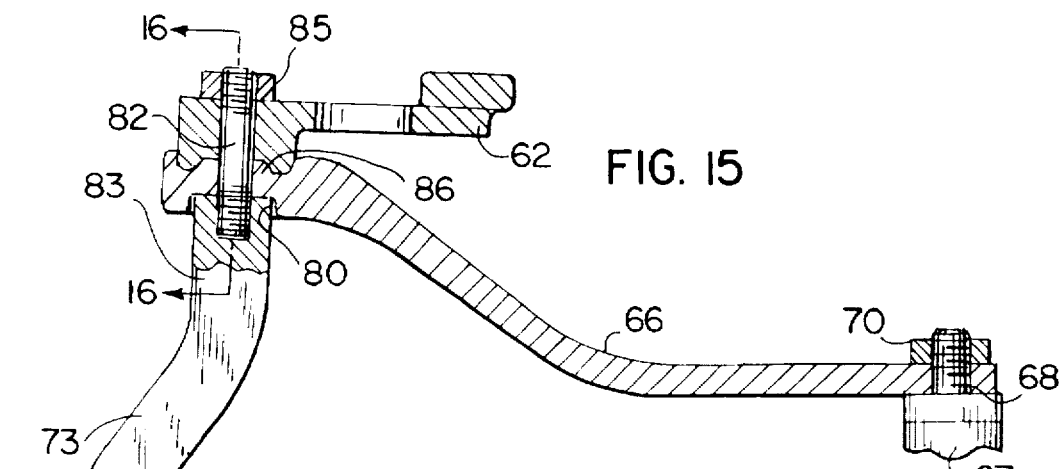
FIG. 15
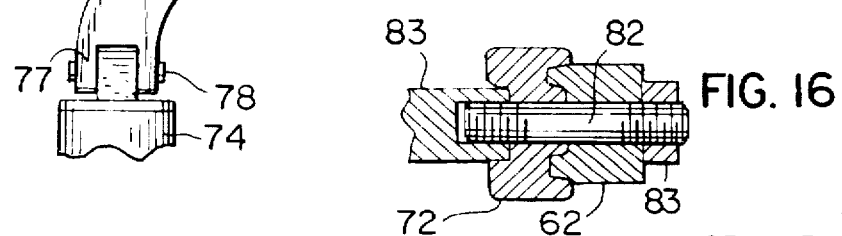
FIG. 16
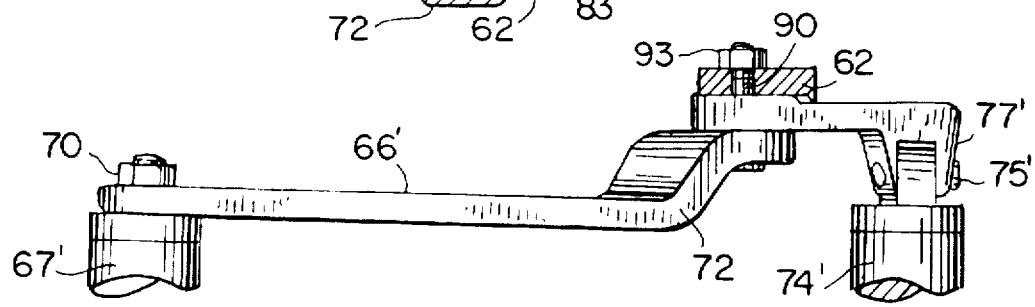
FIG. 17
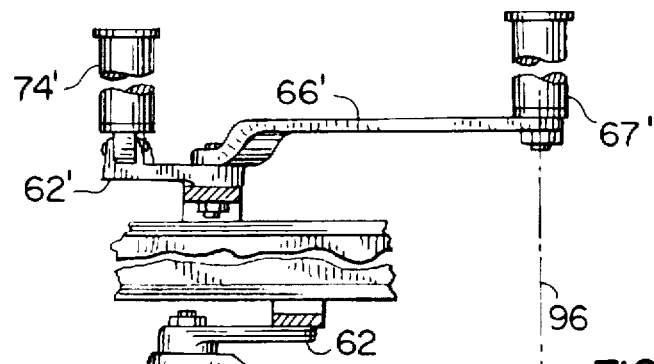
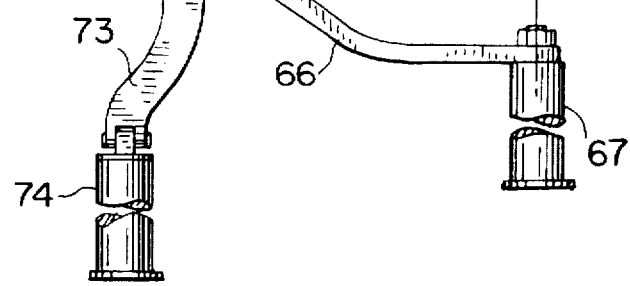
FIG. 18

MOTORCYCLE FOOTREST

FIELD OF THE INVENTION

This invention relates to vehicle accessories, and more particularly to footrests for motorcycles.

BACKGROUND OF THE INVENTION

When motorcycles are driven for a long periods of time, and in particular where two riders may sit one behind the other, the passenger's legs become tired staying in one position, i.e., nearly directly below the passenger. In an effort to improve circulation, the passenger tries to find a place to raise his or her feet to a higher position without interfering with the driver or the frame or other structural elements projecting from the motorcycle. This is difficult, because on standard motorcycles, due to their compactness, there is practically no place to accommodate foot movement.

Prior art investigations have indicated an attempt in U.S. Pat. No. 3,794,353 granted to John L. Oliver on 26 Feb. 1974, the inventor attempted to alleviate the problem, but in this case for only the operator of a motorcycle. The patented disclosure illustrates an auxiliary footpeg or footrest which is fastened directly to the frame by means of U-bolts and contains a member which may be folded out of the way when not in use. There was no discussion nor disclosure of a device to be used by a passenger to accept movement of his or her feet from a single stationary position. Floorboards are illustrated in U.S. Design Pat. No. 283,413 granted to Preisler et al., but again, these are solely for use by the driver or operator of the motorcycle. A further attempt to alleviate the problem, as shown in U.S. Pat. No. 4,451,057 granted 29 May 1984 to L. L. Lawson, is illustrative of an extended footrest device rigidly interconnected, and wherein each of two footrests contributes to the support of the other. A heat shielding footrest is illustrated in U.S. Pat. No. 4,023,821 granted 17 May 1977 to John H. Eiland. This patent illustrates a footrest having an adjustable band clamp which fits around the exhaust pipe to hold the footrest in place.

SUMMARY OF THE INVENTION

In the following discussion of several invention embodiments, like elements bear like reference numerals.

An object of the present invention is to provide a secondary or auxiliary footrest assembly for a motorcycle. In particular, a secondary footrest assembly accommodates a motorcycle passenger, permitting the passenger to shift leg positions during a relatively long drive. The assembly is of simple construction and may be facilely attached to the frame of a motorcycle or to conventional supports for existing footrests. Basically the improved footrest assembly consists of an elongated arm having a base or support portion directly engageable with, and supported by, a cantilevered bracket or similar member extending from the motorcycle frame to support either of a conventional foldable peg or foldable pedal type footrest. The elongated arm extends upwardly from the cantilevered member to provide a support means at the distal end thereof for accommodating an alternative footrest peg. One preferred embodiment of the elongated arm may be fabricated as a single piece, arranged to be held in clamping relationship with a conventional cantilever bracket extending from the cycle frame, and which is readily adaptable for accepting and supporting a conventional a footrest peg at its outer or distal end.

Another object of this invention is to provide several embodiments of an auxiliary footrest assembly for motorcycle passengers, wherein respective rest pegs on pedals are maintained in axial alignment of opposite sides of a motorcycle support frame.

DESCRIPTION OF THE DRAWINGS

FIG. 1 is a perspective, fragmentary view of one embodiment of the improved footrest of this invention illustrating a portion of a motorcycle having mounted thereon a conventional foldable footrest pedal and an improved, auxiliary footrest extending upwardly via an elongated arm member mounted to and extending from a the conventional cantilevered bracket supporting the footrest pedal;

FIG. 2 is a top plan view of the cantilevered bracket and the auxiliary elongated arm member illustrated in the view of FIG. 1;

FIG. 3 is a rear elevational view, partly in section, taken along lines 3—3 of FIG. 1;

FIG. 4 is a side view, partly in section, of the elongated arm and supporting bracket taken along the lines 4—4 of FIG. 2;

FIG. 5 is a perspective exploded, fragmentary view, illustrating means for mounting the elongated arm to the bracket supporting the conventional footrest pedal;

FIG. 6 is a perspective, fragmentary side view of a motorcycle frame supporting another embodiment of the present invention. A foldable passenger footrest peg is supported by a conventional cantilever support member mounted to and extending from a motorcycle frame member. A secondary or auxiliary footrest of the present invention is also supported by the same cantilever support member, and includes an upwardly extending elongated arm supporting at its distal end an auxiliary peg-type footrest;

FIG. 7 is a rear elevational view of the footrest assembly of the embodiment depicted in the view of FIG. 6;

FIG. 8 is a side elevational view of the elongated arm of the embodiment of FIG. 6;

FIG. 9 is a fragmentary view taken along lines 9—9 of FIG. 7, illustrating one form of protuberance extending laterally from the elongated arm for engagement with a frame member of a motorcycle;

FIG. 10 is fragmentary perspective view further illustrating the protruding portion extending laterally from the elongated arm to act as a rotational stop or blocking means for resisting torque when a passenger's foot is applied to the uppermost auxiliary footrest peg;

FIG. 11 is a fragmentary elevational view of a motorcycle frame supporting a further embodiment of the footrest assembly of this invention;

FIG. 12 is an exploded view of the cooperating components of the footrest components disclosed in the view of FIG. 11;

FIG. 15 is a top plan view, partially in section, and taken along lines 15—15 of FIG. 11;

FIG. 16 is a fragmentary sectional view taken along lines 16—16 of FIG. 15;

FIG. 17 is a top plan view, partly in section, taken along lines 17—17 of lines of FIG. 13; and FIG. 18 is a top plan view of the cooperating components of each of the right and left-hand variations of the auxiliary footrest assembly illustrated in the views of FIGS. 11 and 13, respectively.

DETAILED DESCRIPTION

Figure 13:
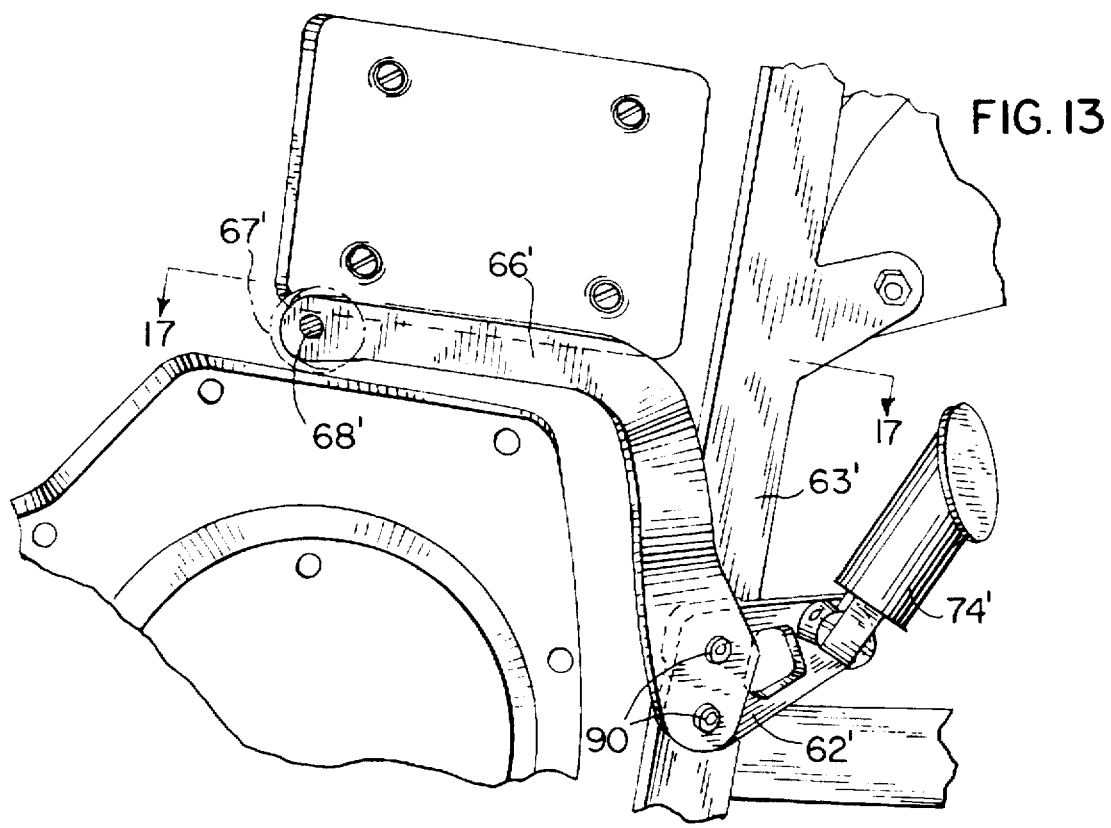
FIG. 13 is a side elevational view, partly in fragment, of the motorcycle frame of FIG. 11, but with the auxiliary footrest assembly of the present invention being of slightly different configuration and supported on the opposite side of the motorcycle frame.
Figure 14:
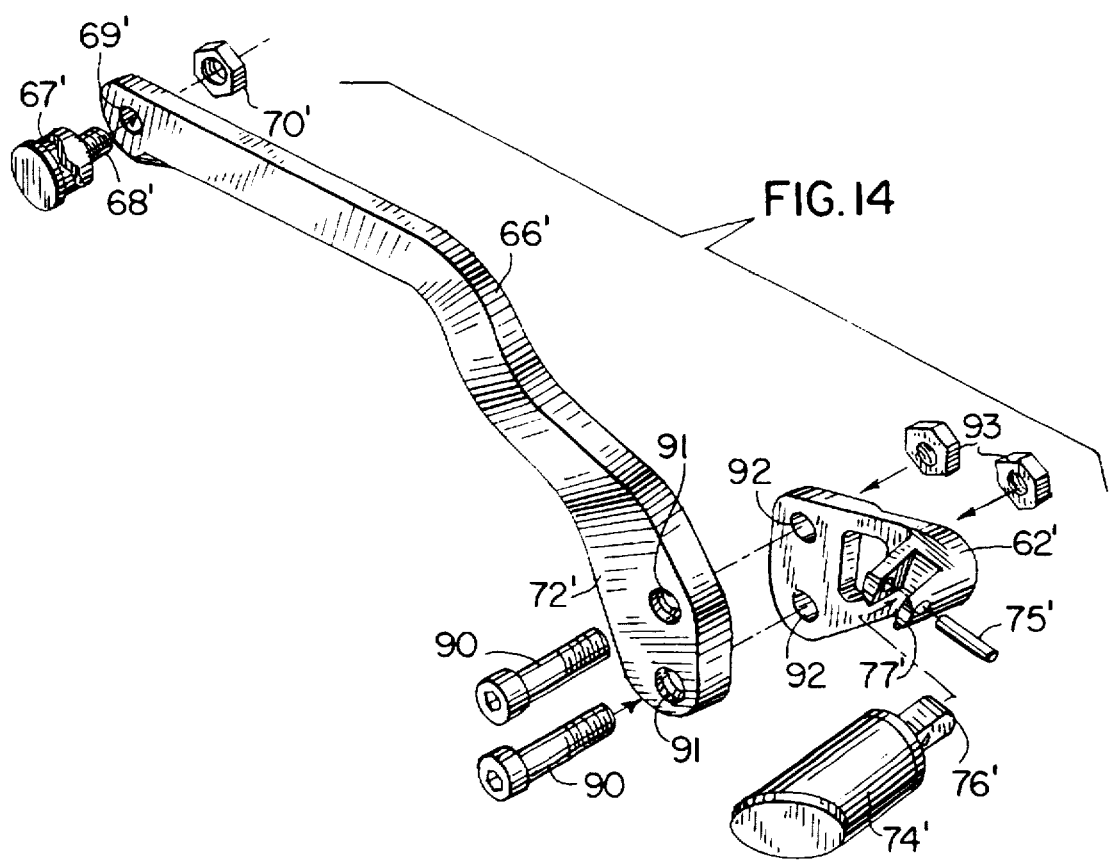
FIG. 14 is an exploded perspective view of the cooperating components of the auxiliary footrest assembly illustrated in the view of FIG. 13.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

With particular reference to the embodiment of this invention illustrated in the views of FIGS. 1-5 inclusive, there is shown a conventional passenger footrest having a foldable pedal-type footrest 11 pivotally supported at the outer end of a cantilever support bracket member 12 conventionally attached to a frame 14 of a motorcycle 15 by means of a threaded bolt 16 engaging a threaded aperture in the frame 14.

The secondary or auxiliary footrest assembly of the present invention comprises an elongated support arm 18 having at its upper or distal end, a peg-type footrest 20 pivotally mounted thereto and arranged to be folded upwardly as shown in FIG. 3 when not in use. The auxiliary footrest peg 20 is fastened in a conventional manner, to a bolted pivot pin 21 passing through a U-shaped stirrup 22 which, in turn, is stationarily fastened to the distal end portion of the arm 18 by means of a bolt and nut assembly 23.

As will be observed from the remaining FIGS. 2-5, inclusive, that the elongated support arm 18 is positioned intermediate the ends of the cantilever bracket member 12 to be spaced both away from the frame 14 and also from the footrest 11, so as not to interfere with the pedal type footrest 11. As shown in FIG. 3, the cantilever bracket 12 is held to the frame 14 by means of the threaded bolt 16 and restrained from rotation by the stud 19 protruding within an aperture in the frame 14. The cantilever support bracket 12 is conventional and is of sufficient length to accommodate the thickness of the elongated arm 18. It is also conventional to provide a bracket 18 of outwardly divergent side surfaces 25 (See FIG. 2) substantially coextensive with the length of the bracket or member 12. In addition the side surfaces 25 of the bracket 12 are angled downwardly with respect to the top surface 26 of the member 12, as shown in the view of FIG. 4.

With particular reference to the views of FIGS. 4 and 5, it will be noted that the inner wall surfaces of the U-shaped clamping portion 29 of the arm 18 define a compound taper at the plane 30 matching the compound taper defined by of the surfaces 25 and 26 of the cantilever support member 12. This preferred arrangement provides a means of resisting considerable torque caused by tortional forces exerted on the lever-like elongated arm 18 when a passenger's foot rests on the peg-type footrest 20, and further resists shearing movement in either outward or inward pressure exerted on the arm 18.

It will be apparent that a relatively simply fabricated assembly has been presented in the embodiment of FIGS. 1-5 inclusive. The featured elongated support arm 18 may be individually packaged, and is readily receptive of conventionally components, such as the footrests 12 and 20. The arm 18 also is supplied with a clamping crossbar 32 for applying clamping pressure to the undersurface of the cantilever support member 12 upon tightening threaded bolts 33 resting against split-washers 34.

It will be further apparent that the present invention may take the form of other embodiments having particular adaptation to variations in motorcycle frames and other structural elements. Another embodiment is illustrated, in the views of FIGS. 6-10, inclusive. Here, the secondary or auxiliary footrest assembly bears the general reference character 40. This embodiment features a single elongated arm 41 arranged to receive a peg-like auxiliary footrest 20 by means of an assembly not unlike that discussed in connection with the first-described embodiment with a nut and bolt assembly 23 extending through an opening in the outer or distal end portion of the elongated support arm 41. The motorcycle frame 43 of this embodiment is of generally tubular construction and includes an opening 45 arranged to receive a reduced diameter cantilever stud 46 having a threaded distal end portion 47 engageable with a nut 40 and projecting axially from a cantilever support member 49. The member 49 is known and conventionally supports the foldable peg-like footrest 50 in a manner similar to that of the arrangement for supporting the secondary footrest 20. In this embodiment the reduced diameter stud 46 is of a sufficient spacing from the frame 43 to receive an apertured lower support portion 52 of the elongated arm 41.

The elongated support arm 41 of the embodiment of FIG. 6 includes a protuberance 53 having a laterally extending portion 54 arranged to abut the outer surface of the frame 43, to thereby provide means for blocking or stopping rotational forces and resisting torque when a passenger foot pressure is applied to the outwardly extending auxiliary footrest 23. The particular reverse-C-shape (See FIG. 9) of the protuberance 53 conforms to the tubular frame of a particular model motorcycle, and may be varied in dimension while remaining within the scope of the present invention. As illustrated in FIGS. 9 and 10, the lower portion 52 of the arm 41 is provided with an aperture 55 for receiving the reduced diameter stud portion 46 of the cantilever support member 49.

It will be apparent that variations in motorcycle models present differences in mounting frame configurations. These differences often require modifications in mounting of respective footrest assemblies to achieve axial alignment of the respective footrest pedals and pegs of the oppositely disposed assemblies. The present invention is readily adapted to accommodate these variations. The embodiments of FIGS. 11-18, inclusive are illustrative of left-hand and right-hand versions of auxiliary footrest assemblies fitted to a particular model motorcycle. The respective versions each provide conventional footrest pegs and axially aligned auxiliary footrest pegs (See FIG. 18).

First, with attention being drawn to the views of FIGS. 11-17, inclusive, the right-hand footrest assembly embodiment, indicated generally by the reference numeral 60, includes a mounting plate 85 secured to a fender 61 and a frame member 63. An elongated support arm 66 supports at its upper, distal end portion, an auxiliary foldable, peg-type auxiliary footrest 67. The footrest 67 is conventionally secured to the elongated arm 66 by means of an axially extending stud 68 received in an aperture 69 located in the distal end of the elongated arm 66, and secured thereto by a nut 70. The lower end or mounting portion 72 of the arm 66 is positioned between the mounting plate 62 and a conventional cantilever bracket 73 supporting a foldable peg-type footrest 74 at its outer end. The foldable footrest 74 is pivotally supported, as previously described, by seating the reduced diameter stud portion 76 in the stirrup 77 of the cantilever bracket 73, and thereafter inserting a pivot pin or rivet 78 through the arms of the stirrup 77, as shown in the exploded view of FIG. 12.

Still another embodiment of the present invention is illustrated in the views of FIGS. 11–18 which particularly relate to left and right-hand auxiliary footrests adapted for support by a particular conventional motorcycle model. The left and right-hand arrangement of the similar footrest assemblies have been configured under the teachings of the present invention to present the primary footrests and the auxiliary footrests to be disposed at opposite sides of the cycle in substantial coaxial alignment with one another. This is automatic in the mounting arrangements illustrated in the previous embodiments illustrated and described in connection with FIGS. 1–5 and 6–10, inclusive.

With attention being drawn to the view of FIG. 11, this side elevational view of a particular model motorcycle is viewed from the right side of the cycle, whereas the view of FIG. 13 is taken at the left side of the same cycle. It will become apparent from the following description that different models of motorcycles, even of the same manufacturer, present variations in mounting frame supports which thereby require minor modifications of the respective footrest assemblies to achieve, without departing from the inventive concept, coaxial alignment of the auxiliary footrest members disposed at opposite sides of the cycle.

With reference to the views of FIGS. 11–16, inclusive, the particular footrest assembly embodiment 60, is adapted for mounting at the right side of a particular model motorcycle. This model cycle includes a fender 61 and a tubular frame member 63. The cooperating elements of the assembly 60 are best described with reference to the exploded view of FIG. 12, wherein an elongated support arm 66 includes, at its distal end, an auxiliary, foldable, footrest peg-type member 67 with an axially projecting, reduced diameter, threaded stud 68 arranged for insertion in an aperture 69 of the arm 66. The threaded stud 68 is retained is retained in place by means of a nut 67 disposed at the opposite side of the arm 66. The lower end or mounting portion 72 of the elongated arm 66 is provided with a recessed mortised area 80 arranged to receive the inner end portion 83 of a cantilever bracket 73. The opposite end of the bracket 73 includes a saddle portion 77 having an opening for receiving a rivet or other type of pivot pin 78, pivotably receiving an axially extending stud 76 of a conventional, foldable peg-type footrest 74. The portion 83 of the bracket 73 is threaded to receive a threaded pin 82 which pin extends through an aperture 81 of the recessed mortise 80 in the portion 72 of the arm 66. As shown in section in the views of FIGS. 15 and 16, the pin 82 extends through the aperture 80 in the portion 72 of the arm 66. The opposite side of the mounting portion 72 contains an embossment 86 adapted to be received by a recessed mortise 87 provided in the mounting plate 85, with the pin 82 engaging a threaded nut 83 for clamping the members together. It will apparent that the embossment 86 and its mating mortise 87 are formed so as to resist rotation of the arm 66 when a passenger places his or her foot on the upper or auxiliary peg-type footrest 67. A mounting plate 62 is secured to the structural elements 62 and 63, as shown in the view of FIG. 11, by means of a bolt and nut assembly 87.

It will be observed that the end 83 of the cantilever bracket 73, its mating mortise recessed in the elongated arm 66, the embossment 86 and its mating mortise 87 are preferably of rectangular configuration to provide a means of resisting torque applied by pressure from the foot of the motorcycle passenger resting on the auxiliary footrest 67.

The footrest assembly, in accordance with the present invention, is shown in the left-hand version exhibited in the views of FIGS. 13–14 and 17–18, inclusive. The operating components of the left-hand version are best described in connection with the exploded view of FIG. 14, wherein the elongated arm 66' includes a conventional peg-type, foldable footrest 74' attached to a mounting bracket 62' by means of inserting a pivot pin or rivet 75' in an opening in a stirrup portion 77' and an axially extending stud 76'.

In the present case, because of the configuration of the particular motorcycle model, the bracket 62' is mounted directly to the motorcycle frame element 63' by means of a pair of bolts 90 projecting through apertures 91 in the lower supporting portion 72' of the elongated support arm 66'. The bolts 90 are further inserted in apertures 92 of the bracket 62' and through openings (not shown) in the strut or member 63' of the motorcycle and fastened in place by threaded nuts 93 at the opposite side of the strut or frame member 63'. Again, the conventional peg-type foldable footrest 74' is fastened to the bracket 62' via reception of the projecting stud 76' by the stirrup 77' of the bracket 62', and held in place by means of the pivot pin 75' which is riveted at opposite ends thereof to the saddle 77'.

It will be noted from the view of FIG. 18, that although the elongated arms 66 and 66' are configured slightly different from one another, they basically provide the same function in supporting the auxiliary or supplementary peg-like footrests 67 and 67' at the outer or distal end portions of each of the respective arms 66, 66'. The conventional footrests 74 and 74' are respectively assembled to the brackets 73 and 62'. As shown in FIG. 18, phantom line 96 illustrates the preferred coaxial alignment of the footrests 67, 67'.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. In a passenger footrest assembly for a motorcycle which comprises a frame, a footrest support member extending laterally from said frame and a first footrest supported by and at a distal end portion of said support member: the improvement comprising an elongated arm arranged to support an alternate footrest extending laterally from a distal end portion of said elongated arm, said elongated arm arranged to be supported by and extending upwardly and forwardly from said footrest support member and to be positioned thereon and relative to said frame and said first footrest; and wherein said footrest support member includes, for at least a portion of its length, a torque resisting cross-sectional geometric configuration having a top linear surface and oppositely disposed linear surfaces depending downwardly from said top linear surface, the lower supporting end of said elongated arm defining a mating, open-ended, torque-resisting cross-sectional surface configuration arranged for supporting engagement with said footrest supporting member, said open-ended surface defining substantially identical matching top and downwardly depending linear surfaces, and means for securing said elongated arm to said footrest support member.

2. In the foot rest of claim 1 said geometric configuration of the footrest support member and of the mating open-ended surface of said elongated arm further defining said depending, oppositely disposed linear surfaces to taper outwardly from said top surface.

3. In the footrest member of claim 1, said elongated arm is secured to said footrest support member by means of a crossbar extending across the open-ended surface of said arm to enclose said surface and to clamp against the lower side of said footrest support member and fastening means for engaging said crossbar with said lower side.

4. In the footrest assembly of claim 1, said first footrest comprises a foldable, relatively flat, foot support including a hinge element pivotally engageable with a stationary hinge element positioned at the distal end portion of said footrest support member.

5. In the footrest assembly of claim 1, said second footrest comprises a laterally extending peg secured at its innermost end to said distal portion of said elongated arm.

6. In a passenger footrest assembly for a motorcycle which comprises a frame, a footrest support member extending laterally from said frame and a first footrest supported by and at a distal end porting of said support member; the improvement comprising an elongated arm arranged to support an alternate footrest extending laterally from a distal end portion of said elongated arm, said elongated arm arranged to be supported by and extending upwardly and forwardly from said footrest support member and to be positioned thereon and relative to said frame and said first footrest and means for resting torque created by pressure exerted upon the alternate footrest, said torque resisting means comprising a protuberance extending laterally from said elongated arm and toward said frame, the laterally extending dimensions of said protuberance being selected to stop rotational movement of said elongated arm with respect to said frame.

7. In a passenger footrest assembly for a motorcycle which comprises a frame, a footrest support member extending laterally from said frame and a first footrest supported by and at a distal end portion of said support member; the improvement comprising an elongated arm arranged to support an alternate footrest extending laterally from a distal end portion of said elongated arm, said elongated arm arranged to be supported by and extending upwardly and forwardly from said footrest support member and to be positioned thereon and relative to said frame and said first footrest, and means for resisting torque created by pressure exerted upon the alternate footrest, said torque resisting means comprising a stationary mounting plate arranged for attachment to said frame, the elongated arm having at its lower end portion a configured recessed mortise for receiving the inner end of said footrest support member and an embossment on the side opposite said mortise arranged to receive a mating recessed mortise formed in said stationary mounting plate to resist rotation of said elongated arm with respect said bracket and said frame.

8. In a passenger footrest assembly for a motorcycle which comprises a frame, a footrest support member extending laterally from said frame and a first footrest supported by and at a distal end portion of said support member; the improvement comprising an elongated arm arranged to support an alternate footrest extending laterally from a distal end portion of said elongated arm, said elongated arm arranged to be supported by and extending upwardly and forwardly from said footrest support member and to be positioned thereon and relative to said frame and said first footrest, and means for securing said elongated arm to said footrest support member and for resisting torque created by pressure exerted upon alternate footrest, said support means and said torque resisting means comprising a stationary mounting plate arranged for attachment to said frame, said elongated arm including at least one aperture at its supported end portion and a threaded bolt extending through coaxial apertures in said arm and said mounting plate, and a threaded nut for clamping said bolt to said mounting plate bracket and to said arm.

9. In the footrest assembly of claim 8, said torque resisting means comprising a second bolt and clamping nut extending through coaxial apertures in the arm and in the mounting plate.

* * * * *